(12) United States Patent
O'Gorman et al.

(10) Patent No.: US 7,694,138 B2
(45) Date of Patent: Apr. 6, 2010

(54) SECURE AUTHENTICATION WITH VOICED RESPONSES FROM A TELECOMMUNICATIONS TERMINAL

(75) Inventors: Lawrence O'Gorman, Madison, NJ (US); Lynne Shapiro Brotman, Westfield, NJ (US); Michael J. Sammon, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1034 days.

(21) Appl. No.: 11/256,224

(22) Filed: Oct. 21, 2005

(65) Prior Publication Data

US 2007/0094497 A1 Apr. 26, 2007

(51) Int. Cl.
*H04L 9/32* (2006.01)
(52) U.S. Cl. .................. 713/168; 704/273; 713/182
(58) Field of Classification Search ........... 713/168, 713/171, 182; 705/67, 72; 726/1–36; 704/231–257, 704/273; 340/5.84; 380/45
See application file for complete search history.

(56) References Cited

U.S. PATENT DOCUMENTS 6,910,129 B1 * 6/2005 Deng et al. ............... 713/171

2006/0294390 A1 * 12/2006 Navratil et al. ........... 713/182
2007/0055517 A1 * 3/2007 Spector ..................... 704/246

OTHER PUBLICATIONS

Kreylos, "ECS 120 Lesson 2—Alphabets, Languages and Grammars, Pt. 2: Finite State Machines, Pt. 1", pp. 1-7, 2001, http://idav.ucdavis.edu/~okreylos/TAship/Spring2001/LectureNotes.pdf.*
Menezes et al., "Handbook of Applied Cryptography", 61 pages, http://www.cacr.math.uwaterloo.ca/hac/.*

* cited by examiner

*Primary Examiner*—Ellen Tran
*Assistant Examiner*—Hee Song
(74) *Attorney, Agent, or Firm*—DeMont & Breyer, LLC

(57) ABSTRACT

A method and an apparatus are disclosed that enable an enhanced, interactive voice response (IVR) system to securely authenticate a user at a telecommunications terminal, without some of the disadvantages in the prior art. In particular, after the user at the telecommunications terminal requests access to a resource, the controlling IVR system of the illustrative embodiment issues a random challenge sequence to the user, along with interspersed "camouflage elements" and one or more directions as to how to respond. The user is then free to speak a returned sequence that answers the combined challenge sequence and interspersed camouflage elements; as a result, an eavesdropper overhearing the user hears what sounds like a random number or string. In short, the technique of the illustrative embodiment uses a challenge-response exchange of a substitution cipher interspersed with camouflage elements.

16 Claims, 6 Drawing Sheets

SECURE AUTHENTICATION WITH VOICED RESPONSES FROM A TELECOMMUNICATIONS TERMINAL

FIELD OF THE INVENTION

The present invention relates to telecommunications in general, and, more particularly, to a secure method of authenticating a user from a telecommunications terminal by using voiced responses from the user.

BACKGROUND OF THE INVENTION

FIG. 1 depicts telecommunications system 100 in accordance with the prior art. Telecommunications system 100 comprises telecommunications network 105, interactive voice response (IVR) system 110, and database system 115, interconnected as shown.

Telecommunications network 105 is a network such as the Public Switched Telephone Network [PSTN], the Internet, and so forth that transports signals between IVR system 110 and other devices, such as telecommunications terminal 106. Telecommunications terminal 106 is a device that is capable of handling voice signals from a user, such as a desktop or notebook computer with a microphone/headset combination, a cellular phone, a hands-free messaging system, and so forth.

IVR system 110 is a data-processing system that enables a user to log in from a remote telecommunications terminal by accepting a combination of voice input and touch-tone keypad selection from the user, and by providing appropriate responses to the user in the form of voice or other media. The user interacts with IVR system 110 to acquire information from or provide information to associated database server 115. The user, having an account on database server 115 or on some other data-processing system associated with system 110, can access one or more resources or services via a telecommunications terminal such as terminal 106 once system 110 grants access to the user.

FIG. 2 depicts a signal flow diagram of signals exchanged between terminal 106 and IVR system 110 in accordance with the prior art. In the signal flow, the user of terminal 106 attempts to access a resource that is associated with database server 115. In response, system 110, which controls the access to server 115, performs authentication on the user by using a first technique in the prior art. Authentication is the process by which a security system, such as one that comprises system 110, verifies that a user is indeed who he or she claims to be. Authentication is a well-understood process in data communications, and many protocols exist in the prior art that provide a level of security through authentication.

Terminal 106 transmits, via signal 201, the user's identity to IVR system 110. System 110 then looks up the corresponding personal identification number (or "PIN") for the user who is "logging in."

IVR system 110 transmits, via signal 202, a prompt for the user of terminal 106 to enter his or her PIN.

Terminal 106 transmits, via signal 203, the PIN information that the user enters via the terminal's keypad.

If the PIN transmitted via signal 203 matches the user's PIN on record, IVR system 110 grants the user, via signal 204, access to the requested resource.

The disadvantage in using this first authentication technique is that many telecommunications terminals are hands-free devices that are operated by user voice commands— sometimes exclusively by voice commands. If such a terminal's user speaks a password instead of entering it via a keypad, then eavesdroppers can hear the password, and the security of database server 115 is consequently breached.

Other techniques for authenticating a user exist in the prior art. In a second technique in the prior art, the user speaks the password while ensuring that no one can overhear the spoken password. The disadvantage with the second technique is that it is often unreasonable to rely on the user to ensure that no one can overhear. In a third technique in the prior art, the user utilizes an electronic token device or a list of numbers to respond to an authentication request with a one-time password response. The disadvantage with the third technique is that it is inconvenient for the user to carry around the token device or list, and having to carrying around something is anyway inconsistent with the notion of using a hands-free terminal. In a fourth technique in the prior art, the authenticating system performs speaker verification on the person requesting access. The disadvantage with the fourth technique is two-fold: the high error rate of speaker verification and concerns that an eavesdropper can record and, therefore, impersonate the user's voice make using the speaker verification technique problematic.

Therefore, what is needed is a secure authentication technique that is based on voiced user responses, without some of the disadvantages in the prior art.

SUMMARY OF THE INVENTION

The present invention enables an enhanced, interactive voice response (IVR) system to securely authenticate a user at a telecommunications terminal, without some of the disadvantages in the prior art. In particular, after the user at the telecommunications terminal requests access to a resource, the controlling IVR system of the illustrative embodiment issues a random challenge sequence to the user, along with interspersed "camouflage elements" and one or more directions as to how to respond. The illustrative embodiment takes advantage of an eavesdropper not being able to hear the challenge sequence because the user is listening to the IVR system in private on a receiving device, such as headset or telephone handset. The user is then free to speak a returned sequence that answers the combined challenge sequence and interspersed camouflage elements; as a result, an eavesdropper overhearing the user hears what sounds like a random number or string. In short, the technique of the illustrative embodiment uses a challenge-response exchange of a substitution cipher interspersed with camouflage elements.

In a first example of the disclosed technique, instead of memorizing a single N-digit personal identification number, such as "4296", the user memorizes N randomly generated substitutions, such as "Red equals 4," "Green equals 2," "Blue equals 9," and "Yellow equals 6." The challenge sequence can be in any order or subset of these colors, and the correct response sequence by the user consists of the numeric digits that correspond to the colors. Furthermore, the challenge sequence—for example, "Yellow, Red, Green"—is augmented with interspersed, unencrypted symbols, which are the camouflage elements referred to earlier. For instance, the sequence that is transmitted as voice signals to the user might be "3, Yellow, 0, 5, Red, Green", which would mean that the correct string returned as voice signals from the user would be "3, 6, 0, 5, 4, 2".

In a second example of the disclosed technique, the user memorizes a single N-digit personal identification number (PIN), such as "4296". The challenge sequence essentially consists of prompts for the digits in the PIN in random order, and the response sequence by the user consists of the correct digits in response to the prompts. Furthermore, the challenge sequence—for example, "Say the third digit, Say the first digit" and so on—is augmented with interspersed, unencrypted symbols (i.e., the camouflage elements). For instance, the sequence transmitted as voice signals to the user might be "3, Say the fourth PIN digit, 0, 5, Say the second PIN digit, Say the third PIN digit", and so on. The correct response from the user would then be "3, 6, 0, 5, 2, 9", and so on. In some alternative embodiments, the prompt for the digits of the PIN might be in a non-random order.

In accordance with the illustrative embodiment, the orders of challenge elements and camouflage elements are random as is the interspersion of these two types of elements in the transmitted sequence. The numbers of challenge and camouflage elements are chosen to maximize secrecy and minimize authentication time. To achieve the security levels required and to convey no future authentication information to an eavesdropper, the relationship between the number of challenge elements and the number of camouflage elements is taken into consideration.

The illustrative embodiment of the present invention comprises: a transmitter for transmitting, to a user: (i) a first symbol unencrypted, (ii) a first direction to return, unencrypted, the first symbol, (iii) a challenge, and (iv) a second direction to return a response to the challenge; and a receiver for receiving the first symbol and the response from the user; wherein the first symbol and the response are symbols in the same alphabet.

DETAILED DESCRIPTION

The following terms are defined for use in this Specification, including the appended claims:

The term "string" is defined as a contiguous sequence of elements (e.g., symbols, etc.) of the same type (e.g., the numeric digits, the letters of the Latin alphabet, etc.). For example, the string {1, 3, 9, 2, 7} consists of elements that are numeric digits.

The term "alphabet" is defined as a system of representative symbols. For example, the alphabet of numeric digits (a first alphabet type) consists of the numbers 0 through 9. The alphabet of the colors of a rainbow (a second alphabet type) consists of the names of the colors red, orange, yellow, green, blue, indigo, and violet. The symbols in an alphabet can be used as elements in a sequence or string.

Figure 1:
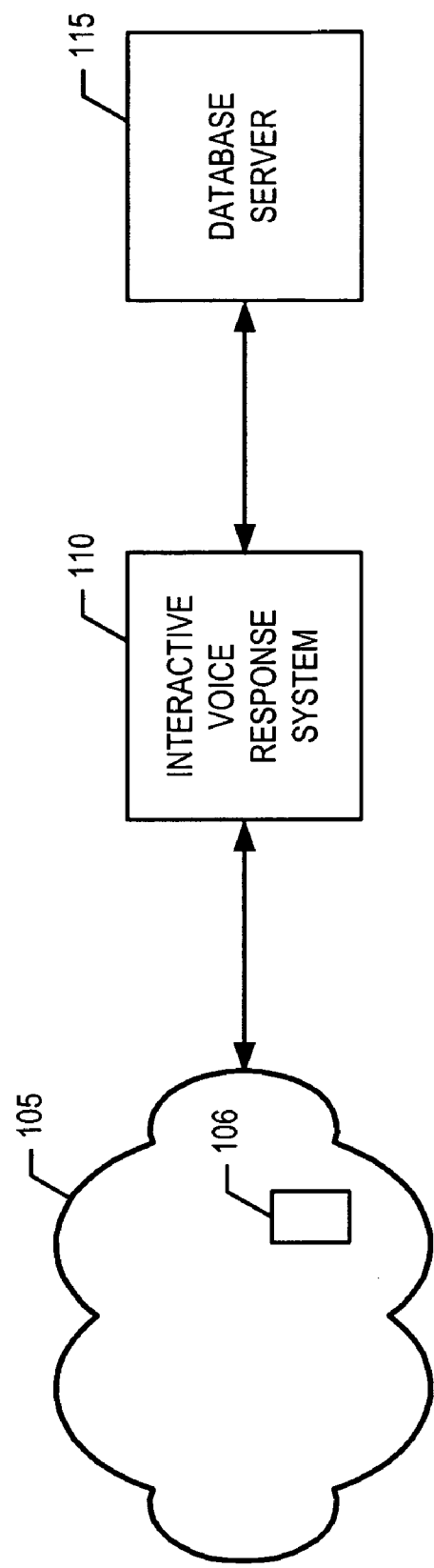
FIG. 1 depicts telecommunications system 100 in accordance with the prior art.
Figure 2:
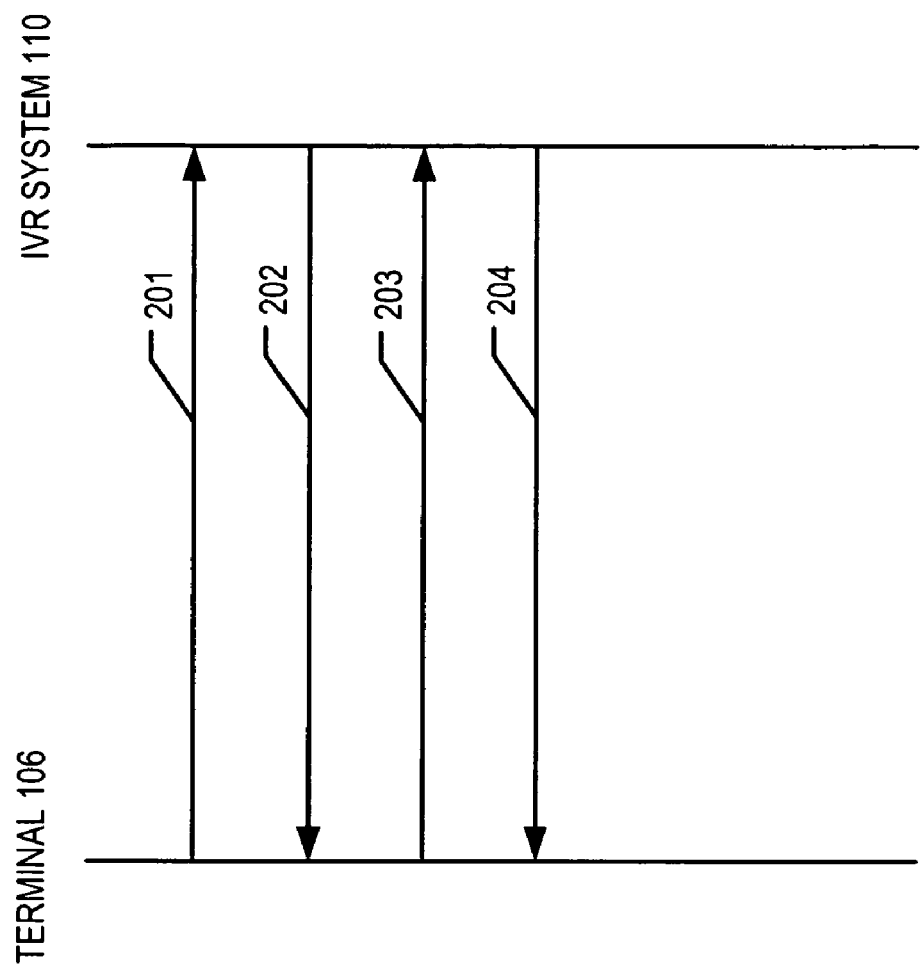
FIG. 2 depicts a signal flow diagram of signals exchanged between terminal 106 and IVR system 110 in accordance with the prior art.
Figure 3:
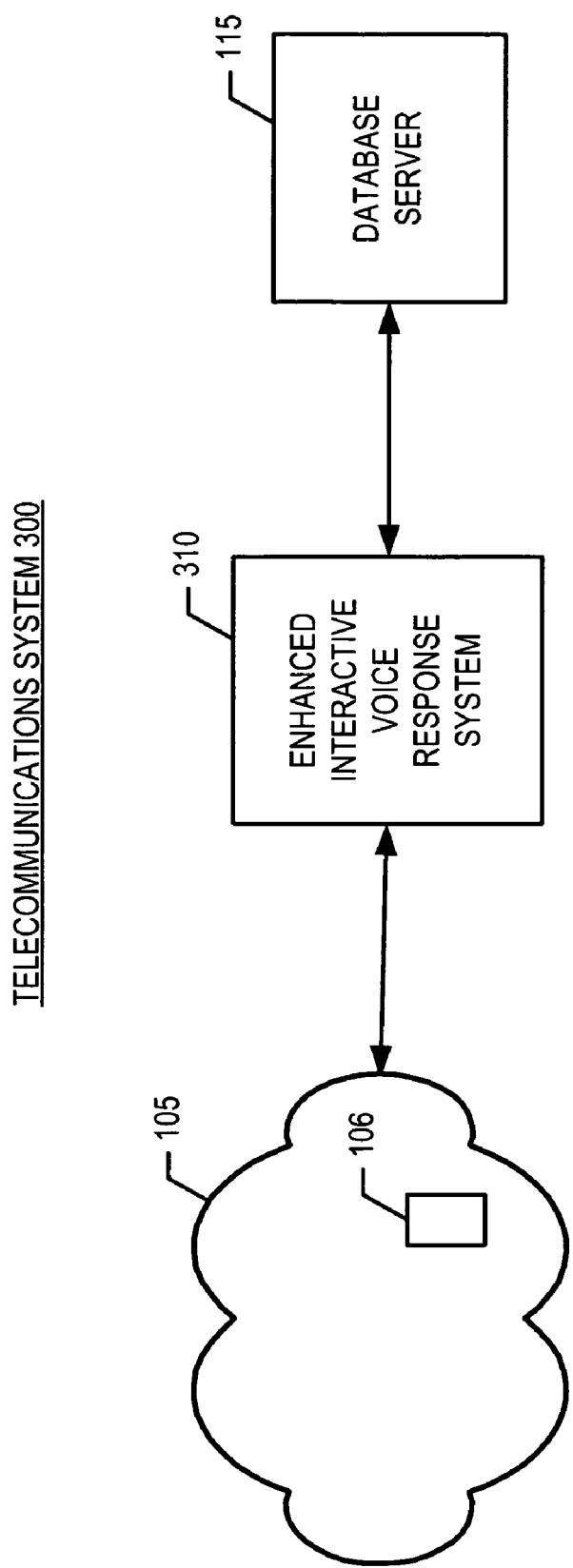
FIG. 3 depicts telecommunications system 300 in accordance with the illustrative embodiment of the present invention.

FIG. 3 depicts telecommunications system 300 in accordance with the illustrative embodiment of the present invention. Telecommunications system 300 comprises telecommunications network 105, which serves telecommunications terminal 106, and enhanced interactive voice response (IVR) system 310, interconnected as shown.

Enhanced IVR system 310 is an interactive voice response system, as is known in the art, that enables a user to log in from a remote telecommunications terminal such as terminal 106. System 310 enables the user to log in by accepting voice input (and, in some embodiments, touch-tone keypad selection), and by providing appropriate commands and replies to the user in the form of voice or other media. The user interacts with system 310 to acquire information from or provide information to associated database server 115 through the telecommunications terminal. If system 310 grants the user access, the user is then able to use one or more resources or services associated with database server 115. As those who are skilled in the art will appreciate, in some alternative embodiments, system 310 can authenticate a user on behalf of another data-processing system other than server 115.

In accordance with the illustrative embodiment, enhanced IVR system 310 securely authenticates each user who logs in, as described below and with respect to FIGS. 5 and 6. In support of secure authentication, system 310 is capable of transmitting voice signals to a user and is capable of receiving voice signals from a user, in well-known fashion. As those who are skilled in the art will appreciate, in some alternative embodiments, a data-processing system other than an interactive voice response system can be used to authenticate the user. In any case, it will be clear to those skilled in the art, after reading this specification, how to make and use enhanced IVR system 310.

Figure 4:
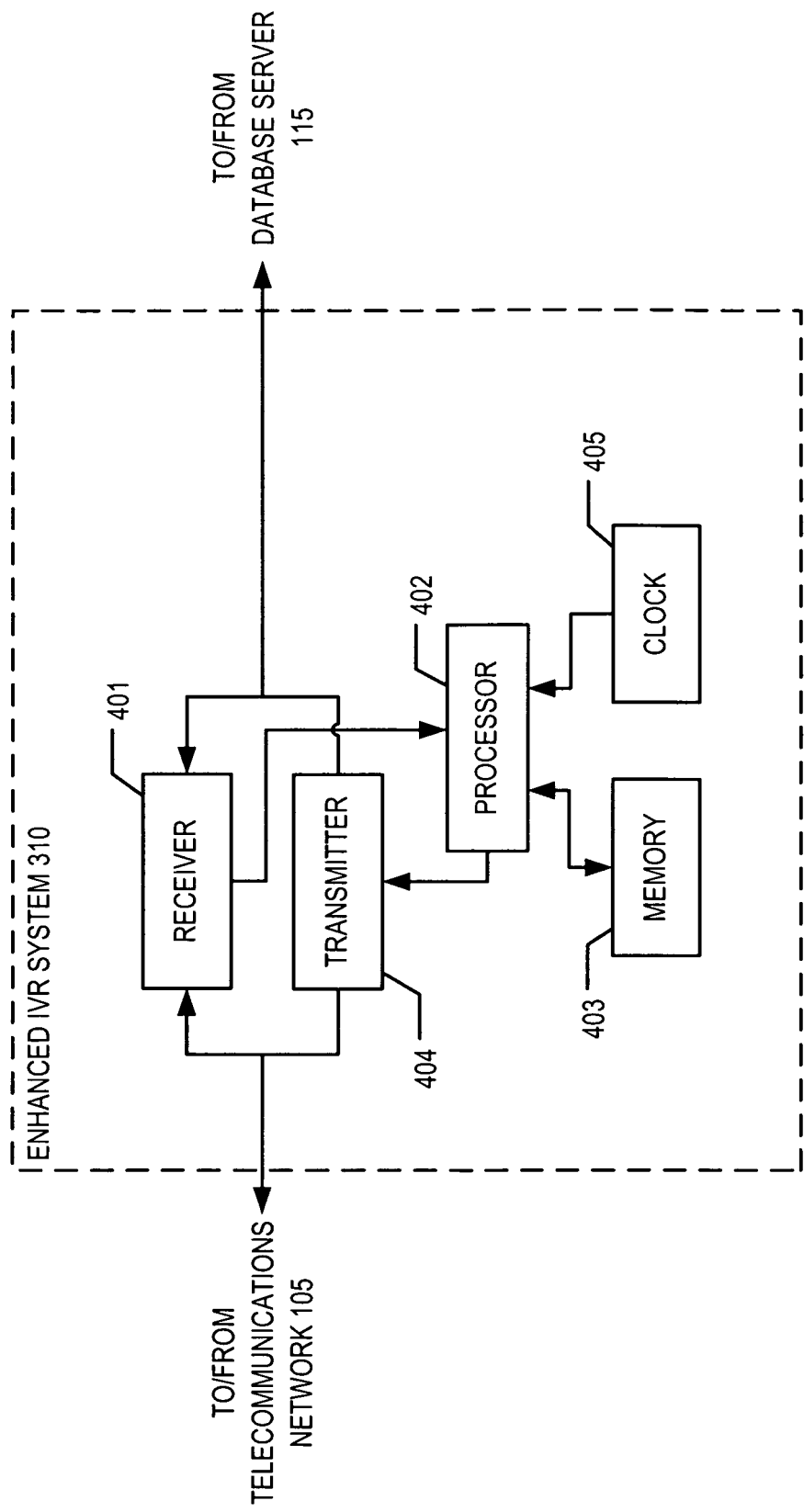
FIG. 4 depicts the salient components of IVR system 310 in accordance with the illustrative embodiment of the present invention.

FIG. 4 depicts the salient components of enhanced IVR system 310 in accordance with the illustrative embodiment of the present invention. System 310 comprises receiver 401, processor 402, memory 403, transmitter 404, and clock 405, interconnected as shown.

Receiver 401 receives (i) signals from telecommunications terminals such as terminal 106 via telecommunications network 105 and (ii) signals from database server 115, and forwards the information encoded in the signals to processor 402, in well-known fashion. It will be clear to those skilled in the art, after reading this specification, how to make and use receiver 401.

Processor 402 is a general-purpose processor that is capable of receiving information from receiver 401, executing instructions stored in memory 403, reading data from and writing data into memory 403, executing the tasks described below and with respect to FIG. 5, and transmitting information to transmitter 404. In some alternative embodiments of the present invention, processor 402 might be a special-purpose processor. In either case, it will be clear to those skilled in the art, after reading this specification, how to make and use processor 402.

Memory 403 stores the instructions and data used by processor 402. Memory 403 might be any combination of random-access memory (RAM), flash memory, disk drive memory, and so forth. It will be clear to those skilled in the art, after reading this specification, how to make and use memory 403.

Transmitter 404 receives information from processor 402 and transmits signals that encode this information to (i) telecommunications terminals such as terminal 106 via telecommunications network 105 and (ii) database server 115, in well-known fashion. It will be clear to those skilled in the art, after reading this specification, how to make and use transmitter 404.

Clock 405 transmits the current time and date to processor 402 in well-known fashion.

Figure 5:
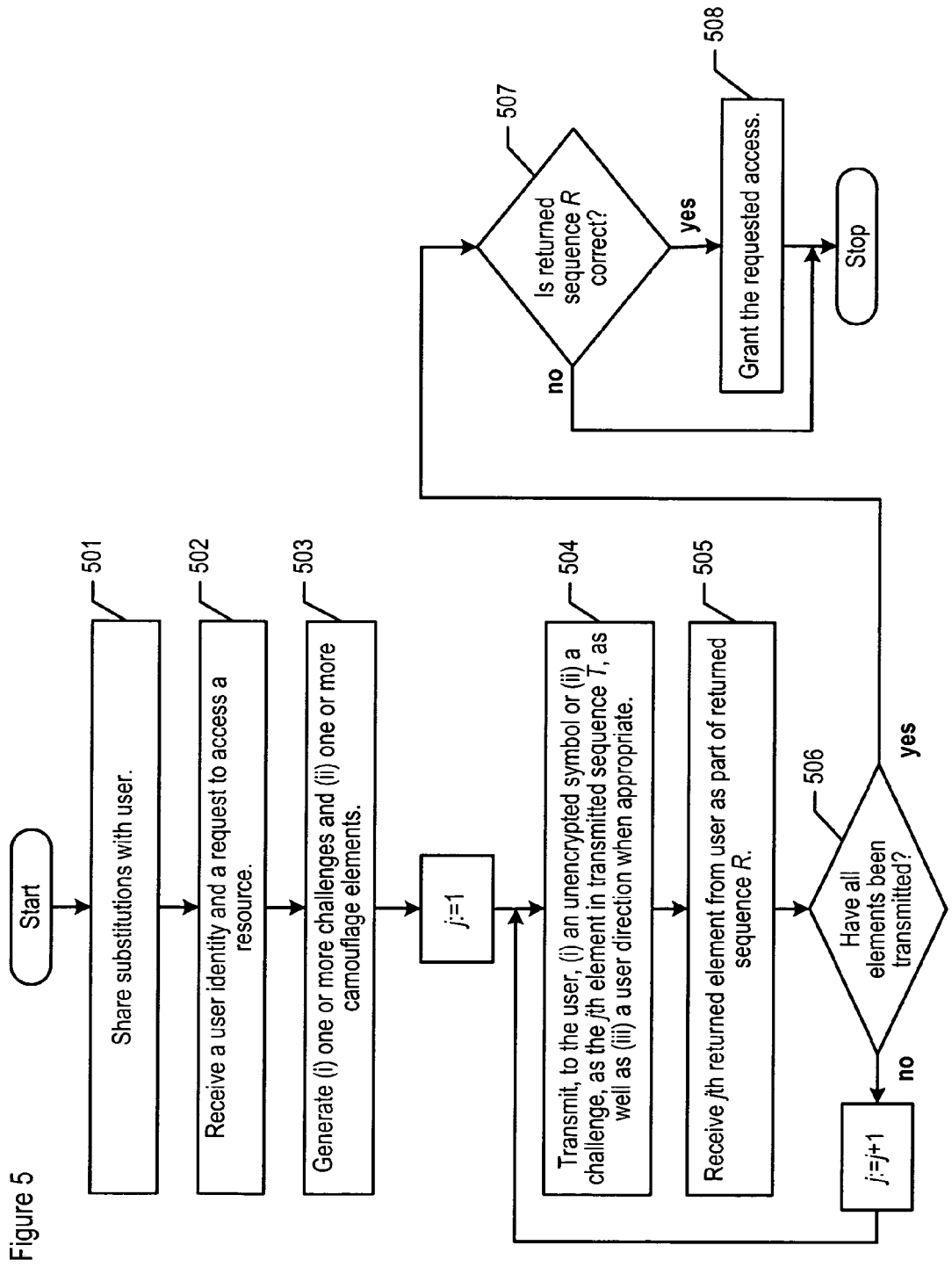
FIG. 5 depicts a flowchart of the salient tasks of IVR system 310 authenticating a user, in accordance with the illustrative embodiment of the present invention.

FIG. 5 depicts a flowchart of the salient tasks of enhanced IVR system 310 authenticating a user, in accordance with the illustrative embodiment of the present invention. It will be clear to those skilled in the art which tasks depicted FIG. 5 can be performed simultaneously or in a different order than that depicted.

When a user account is initialized or changed, at task 501, enhanced IVR system 310 shares N randomly generated substitution symbols with a user, wherein N is a positive integer. These symbols correspond to a secret string of symbols that is known only to the user and the security system. For example, if the secret string is "4296" (i.e., N is equal to four), then system 310 might have the user memorize "red=4, green=2, blue=9, yellow=6", wherein the substitution symbols "red," "green," "blue," and "yellow" are from an alphabet whose type is the names of colors. In some alternative embodiments, the secret string of symbols is used as a password, such as a personal identification number (or "PIN"), in which case system 310 does not require that the new user memorize substitution symbols. As those who are skilled in the art will appreciate, many methods exist that provide adequate security in the sharing of the information with the user, such as a letter or email with minimal details that is sent to the user's address of record.

Later on when the user wishes to access system 310 (e.g., via terminal 106, etc.), at task 502, system 310 receives the user's identity (e.g., a user name, an account number, a calling telephone number, etc.) in well-known fashion. System 310 looks up the secret string of symbols (i.e., "4296") and the substitutions (i.e., "Red=4, Green=2, Blue=9, Yellow=6") that are associated with the particular user.

At task 503, system 310 generates one or more authentication challenge elements $h_1, \ldots, h_M$ as part of an authentication challenge sequence H, wherein M is a positive integer less than or equal to N. The challenge elements are based on the user's memorized substitutions (i.e., Red, Green, Blue, Yellow), in that the challenge elements are in any order or from any subset of the substitutions. For example, a first challenge sequence might be equal to {Yellow, Red, Green}, and a second challenge sequence might be equal to {Blue, Green, Red, Yellow}.

System 310 also generates at task 503 one or more camouflage elements $f_1, \ldots, f_P$, wherein P is a positive integer. The symbols that make up the camouflage elements are from the same alphabet (e.g., the set of numeric digits, etc.) as are the elements of the user's secret string. As those who are skilled in the art will appreciate, the number of camouflage elements are chosen based on the number of challenge elements, so as to achieve the required security levels and to convey no future authentication information to an eavesdropper listening in on the user. In some embodiments, the challenge elements and camouflage elements are chosen so that the returned sequence R to be received from the user comprises, assuming that the user spoke the sequence correctly, at least one instance of every symbol in the alphabet (e.g., the set of numeric digits, etc.) that is used by returned sequence R. For example, if the challenge elements were "yellow, red, green,"which correspond to "6, 4, 2," then the camouflage elements to be used would be the digits 0, 1, 3, 5, 7, 8, and 9, not necessarily in the order shown.

There is, of course, the possibility that an eavesdropper could try to log in as the user to crack the security system. By listening to the obvious differences between challenge elements (e.g., "red", etc.) and camouflage elements (e.g., "7", etc.), the eavesdropper might eventually figure out the user's secret string. To address this possibility, in some embodiments, the number of elements in the overall transmitted sequence of challenge and camouflage elements exceeds the total number of different symbols in the alphabet that is used to represent the user's secret string. For instance, if the secret string consists of numeric digits, the total number of elements transmitted by system 310 should be at least eleven, in some embodiments.

In generating the challenge and camouflage elements, system 310 forms transmitted sequence T, which is made up of challenge elements $h_1, \ldots, h_M$ and camouflage elements $f_1, \ldots, f_P$. In forming transmitted sequence T, system 310 intersperses the camouflage elements of the illustrative embodiment (also referred to as "unencrypted symbols") among the challenge elements of the illustrative embodiment. The order of the challenge elements and the camouflage elements is random, as is the interspersion of the two types of elements in transmitted sequence T.

At task 504, system 310 transmits to the user the jth element of transmitted sequence T, starting with the first element. System 310 will execute task 504 for each element to be transmitted in sequence T, for j=1 through J wherein J has a value of (M+P). By repeatedly executing task 504, in accordance with the illustrative embodiment, system 310 transmits to the user voice signals that convey:

i. one or more unencrypted symbols (i.e., camouflage elements), ii. one or more challenges (i.e., challenge elements), iii. at least one direction for the user to return, unencrypted, the one or more unencrypted symbols being transmitted, and iv. at least one direction for the user to return responses to the one or more challenges.

In accordance with the illustrative embodiment, system 310 transmits each element in transmitted sequence T one at a time and waits after each element transmitted for the corresponding element in the returned sequence R to be received. Alternatively, system 310 can transmit the entire transmitted sequence T before expecting the returned sequence R to be received from the user.

In transmitting the one or more directions to the user, system 310 provides the user with verbal commands in combination with the unencrypted symbols and challenges. As a first example, system 310 might tell the user something like "Say the number 3, Say the number that stands for 'Yellow', Say the number 0", and so on; in the example, "3" and "0" are some of the unencrypted symbols transmitted, and "Yellow" is one of the challenges transmitted. As a second example, system 310, might tell the user in advance what do to and then provide the series of challenges and unencrypted symbols to the user.

In accordance with the illustrative embodiment, system 310 transmits audio-bearing signals to the user, who receives the information encoded in the signals through a headset. In some alternative embodiments, system 310 transmits video-bearing signals to the user, who receives the information encoded in the signals via the video display on the user's telecommunications terminal. For example, system 310 can transmit pictures instead of symbols as part of transmitted sequence T (or its equivalent), such as a picture of a dog, then a picture of "1", then a picture of "4", then a picture of a flower, and so forth.

System 310, in some alternative embodiments, transmits the unencrypted symbols interspersed with prompts for each digit of the user's secret string such as a person identification number (or "PIN"). For example, system 310 might tell the user something like "Say the number 3, Say the fourth digit of your PIN, Say the number 0", and so on; in the example, "3" and "0" are some of the unencrypted symbols transmitted, and "the fourth digit of your PIN" is essentially one of the challenges transmitted.

In some embodiments, system 310 regulates the time taken to transmit one or more of the directions to the user; system 310 bases the time taken on an estimate of the time needed by the user to return the responses to the challenges. It is generally easier for the user to repeat an unencrypted symbol that is told to the user than it is for the user to recall and say the correct response to a challenge (e.g., "6" being the correct response to the challenge "Yellow", etc.); therefore, system 310 might deliberately retard the transmitting of one or more of the unencrypted symbols. System 310 regulates at least some of the transmissions so as not to allow an eavesdropper to figure out which of the voiced returns by the user are the unencrypted symbols (i.e., the elements that are quick to repeat) and which are the responses to the challenges (i.e., the elements that take longer to recall and return).

At task 505, system 310 receives the corresponding jth returned element as part of returned sequence R. The returned element from the user might be either a voiced return of the corresponding unencrypted symbol or a voiced response to the corresponding challenge already transmitted by system 310.

In accordance with the illustrative embodiment, system 310 receives audio-bearing signals from the user, who provides the information encoded in the signals through a microphone. In some alternative embodiments, system 310 receives keypad-originated signals (e.g., dual tone multi-frequency [DTMF] signaling, etc.) from the user, who provides the information encoded in the signals via the keypad on the user's telecommunications terminal. For example, system 310 might receive returned sequence R via a series of DTMF tones. An embodiment of the present invention that accommodates keypad-originated signals from the user can be applied to provide security in the presence of a "keyboard sniffer" (or "keyboard logger"), which is malware that records a telecommunications terminal's keystrokes, including typed passwords.

At task 506, system 310 determines if it has transmitted the entire transmit sequence T. If it has, task execution proceeds to task 507. Otherwise, task execution proceeds back to task 504 to transmit and receive the next transmitted/returned element pair in sequences T and R, respectively.

At task 507, system 310 determines if returned sequence R is correct for the particular user. As those who are skilled in the art will appreciate, various criteria exist for determining whether the sequence is correct, such as matching all of the elements, matching a majority of the elements, and so forth. If returned sequence R is correct, task execution proceeds to task 508. Otherwise, task execution ends.

At task 508, system 310 grants the requested access to the user. The access, for example, might be to a particular database or to a transaction procedure that involves database server 115. After task 508, task execution ends.

Figure 6:
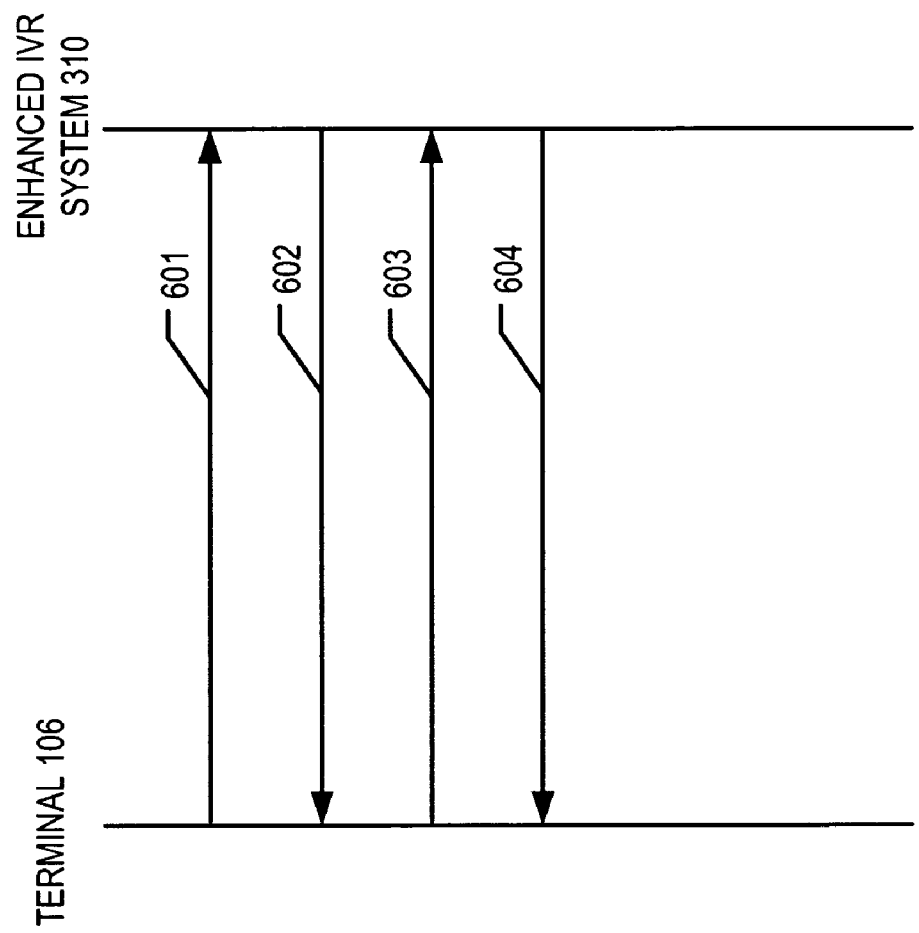
FIG. 6 depicts a signal flow diagram of an authentication procedure in accordance with the illustrative embodiment of the present invention.

FIG. 6 depicts a signal flow diagram of an authentication procedure in accordance with the illustrative embodiment of the present invention. In the signal flow, the user of telecommunications terminal 106 is attempting to gain access to a resource, wherein enhanced IVR system 310 controls access to the resource and authenticates the user accordingly. The figure illustrates that the technique of the illustrative embodiment uses a challenge-response exchange of a substitution cipher that is augmented with interspersed camouflage elements, wherein the technique permits the user to reply verbally to the challenge and camouflage elements. For illustrative purposes, the depicted signal flow shows all of the challenge elements and camouflage elements that constitute transmitted sequence T as being transmitted contiguously to the user.

Referring to FIG. 6, terminal 106 transmits, via signal 601, its user's identity and an access request to enhanced IVR system 310 in well-known fashion System 310, via signal 602, transmits transmitted sequence T to terminal 106 in accordance with the illustrative embodiment. Transmitted sequence T comprises one or more unencrypted symbols and one or more challenges. System 310 also transmits directions to terminal 106 on how the user should respond. The sequence transmitted via voice signals to the user might be:

3, Yellow, 0, 5, Red, Green.

Terminal 106 transmits, via signal 603, returned sequence R to system 310. Returned sequence R comprises the one or more unencrypted symbols and the one or more responses that correspond to the challenges, assuming that the user replies correctly, where all symbols and responses are in the same alphabet. For the transmitted sequence given above, the correct sequence returned verbally by the user would be:

3, 6, 0, 5, 4, 2.

Based on a correct returned sequence R, system 310, via signal 604, notifies the user that the access request has been granted.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   transmitting, from an interactive voice response system to a user:
   (i) a first symbol, unencrypted,
   (ii) a first direction to return the first symbol, unencrypted,
   (iii) a first challenge that comprises one or more symbols from an alphabet that is different from that of a correct response to the first challenge, wherein the first symbol and the correct response are symbols in the same alphabet, and (iv) a second direction to return the correct response to the first challenge;

receiving, at the interactive voice response system, a returned sequence R comprising as elements (i) a voiced symbol in response to the first symbol and (ii) a voiced response in response to the first challenge; and granting the user access to a resource, based on the returned sequence R being correct.

2. The method of claim 1 wherein the correct response comprises one or more symbols from an alphabet that consists of the set of numeric digits, and wherein the first challenge comprises one or more symbols from an alphabet that consists of a non-empty set of names of colors.

3. The method of claim 1 wherein the returned sequence R comprises at least one instance of every symbol in the alphabet used by R.

4. The method of claim 1 wherein the first symbol and the first challenge are elements in a transmitted sequence T, wherein the transmitted sequence T comprises (i) a plurality of challenges that comprises the first challenge and (ii) a plurality of camouflage elements that comprises the first symbol, and wherein the elements of the plurality of camouflage elements are interspersed among the elements of the plurality of challenges.

5. The method of claim 4 wherein the number of elements in the transmitted sequence T exceeds the number of different symbols in the alphabet used by the returned sequence R.

6. The method of claim 1 wherein the time taken to transmit the first direction is based on an estimate of the time needed by the user to return the correct response to the first challenge.

7. A method comprising:

transmitting, from an interactive voice response system to a user:

(i) a plurality of unencrypted symbols, (ii) a plurality of challenges interspersed with the unencrypted symbols and having a substitution relationship with correct responses to the challenges, the substitution relationship having been previously shared, wherein the unencrypted symbols and the correct responses to the challenges are symbols in the same alphabet, and (iii) at least one direction to return the plurality of unencrypted symbols and the correct responses to the challenges;

receiving, at the interactive voice response system, a returned sequence R comprising as elements (i) a plurality of voiced symbols in response to the plurality of unencrypted symbols and (ii) a plurality of voiced responses in response to the plurality of challenges; and granting the user access to a resource, based on the returned sequence R being correct.

8. The method of claim 7 wherein the plurality of challenges comprises symbols from an alphabet that is different from that of the symbols in the correct responses to the challenges.

9. The method of claim 8 wherein the correct responses to the challenges comprise symbols from an alphabet that consists of the set of numeric digits, and wherein the plurality of challenges comprises symbols from an alphabet that consists of a non-empty set of names of colors.

10. The method of claim 7 wherein the returned sequence R comprises at least one instance of every symbol in the alphabet used by R.

11. The method of claim 10 wherein the plurality of unencrypted symbols and the plurality of challenges constitute a transmitted sequence T, wherein the number of elements in the transmitted sequence T exceeds the number of different symbols in the alphabet used by the returned sequence R.

12. The method of claim 7 wherein the time taken to transmit the plurality of unencrypted symbols is based on an estimate of the time needed by the user to return the correct responses to the challenges.

13. A method comprising:

transmitting, from an interactive voice response system to a user:

(i) a first symbol from an alphabet that consists of the set of numeric digits, (ii) a first direction to return the first symbol, (iii) a first challenge comprising one or more symbols from an alphabet that consists of a non-empty set of names of colors, and (iv) a second direction to return a correct response to the first challenge, the correct response comprising one or more symbols from the alphabet that consists of the set of numeric digits;

receiving, at the interactive voice response system, a returned sequence R comprising as elements (i) a voiced symbol in response to the first symbol and (ii) a voiced response in response to the first challenge; and granting the user access to a resource, based on the returned sequence R being correct.

14. The method of claim 13 wherein the first symbol and the first challenge are elements in a transmitted sequence T, wherein the transmitted sequence T comprises (i) a plurality of challenges that comprises the first challenge and (ii) a plurality of camouflage elements that comprises the first symbol, and wherein the elements of the plurality of camouflage elements are interspersed among the elements of the plurality of challenges.

15. The method of claim 14 wherein the number of elements in the transmitted sequence T exceeds the number of different symbols in the alphabet used by the returned sequence R.

16. The method of claim 13 wherein the time taken to transmit the first direction is based on an estimate of the time needed by the user to return the correct response to the first challenge.

* * * * *